(12) United States Patent
Holcombe et al.

(10) Patent No.: US 7,031,458 B2
(45) Date of Patent: Apr. 18, 2006

(54) METHOD AND APPARATUS FOR ISOLATION IN A DATA ACCESS ARRANGEMENT USING ANALOG ENCODED PULSE SIGNALING

(75) Inventors: Wayne T. Holcombe, Mountain View, CA (US); Matthijs D. Pardoen, Sunnyvale, CA (US)

(73) Assignee: Integration Associates Inc., Mountain View, CA (US)

( * ) Notice: Subject to any disclaimer, the term of this patent is extended or adjusted under 35 U.S.C. 154(b) by 436 days.

(21) Appl. No.: 10/013,901

(22) Filed: Oct. 30, 2001

(65) Prior Publication Data

US 2003/0091183 A1    May 15, 2003

(51) Int. Cl.
*H04M 1/00* (2006.01)
*H04M 9/00* (2006.01)
*H04M 9/08* (2006.01)

(52) U.S. Cl. .................................. 379/399.02
(58) Field of Classification Search ........... 379/390.01, 379/390.04, 394, 399.01, 399.02, 402, 416, 379/417, 339
See application file for complete search history.

(56) References Cited

U.S. PATENT DOCUMENTS

| | | | |
|---|---|---|---|
| 4,292,595 A | | 9/1981 | Smith |
| 4,301,336 A | * | 11/1981 | Muting ..................... 379/405 |
| 4,835,486 A | * | 5/1989 | Somerville ................. 330/10 |
| 4,879,745 A | * | 11/1989 | Arbel ..................... 379/388.06 |
| 5,369,666 A | | 11/1994 | Folwell et al. |
| 5,500,895 A | | 3/1996 | Yurgelites |
| 5,654,984 A | | 8/1997 | Hershbarger et al. |
| 5,790,656 A | | 8/1998 | Rahamim et al. |
| 5,870,046 A | | 2/1999 | Scott et al. |
| 5,946,393 A | | 8/1999 | Holcombe |
| 5,991,335 A | | 11/1999 | Price |
| 6,107,948 A | | 8/2000 | Scott et al. |

(Continued)

FOREIGN PATENT DOCUMENTS

EP        0 973 305 A1     1/2000

OTHER PUBLICATIONS

Allen et al., "CMOS Analog Circuit Design," HRW Series in Electrical and Computer Engineering, 349-357 (1987).

(Continued)

*Primary Examiner*—Curtis Kuntz
*Assistant Examiner*—Alexander Jamal
(74) *Attorney, Agent, or Firm*—Francissen Patent Law, P.C.

(57) ABSTRACT

The present invention is directed toward a method and apparatus for transferring data across an isolation barrier using high speed analog encoded signals. A line side circuit interfaces with tip and ring contacts on one side of a capacitive isolation barrier that isolates the line side circuit from a modem side circuit. During an on-hook state, the line side circuit converts an analog line side voltage signal to a frequency signal and then encodes the frequency signal into a high frequency pulse-width-modulated (PWM) signal. The high frequency PWM signal is transmitted across the capacitive isolation barrier to the modem side circuit. During an off-hook state, the analog line side voltage is again encoded into a high frequency pulse-width-modulated (PWM) signal for transmission across the isolation barrier. The modem side circuit recovers the transmitted PWM signal and converts it into a digital count value that represents the amplitude of the analog voltage observed at the tip and ring. The digital count value may be directly processed by a processor on the modem side or may be converted back to an analog signal.

20 Claims, 8 Drawing Sheets

U.S. PATENT DOCUMENTS

| | | | |
|---|---|---|---|
| 6,137,827 A | 10/2000 | Scott et al. | |
| 6,434,220 B1 * | 8/2002 | Oi | 379/24 |
| 6,754,341 B1 * | 6/2004 | Scott et al. | 379/413 |
| 2001/0033190 A1 | 10/2001 | Bendall | |
| 2001/0033650 A1 | 10/2001 | Wilson et al. | |

OTHER PUBLICATIONS

Copy of European Search Report established for EP 02024427.3.

* cited by examiner

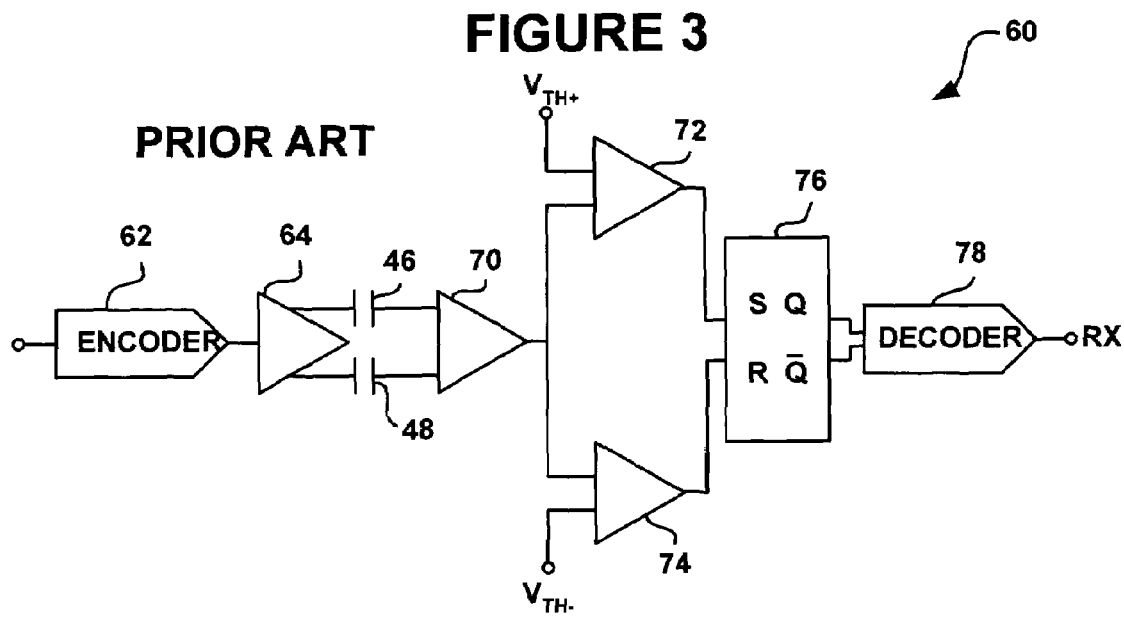
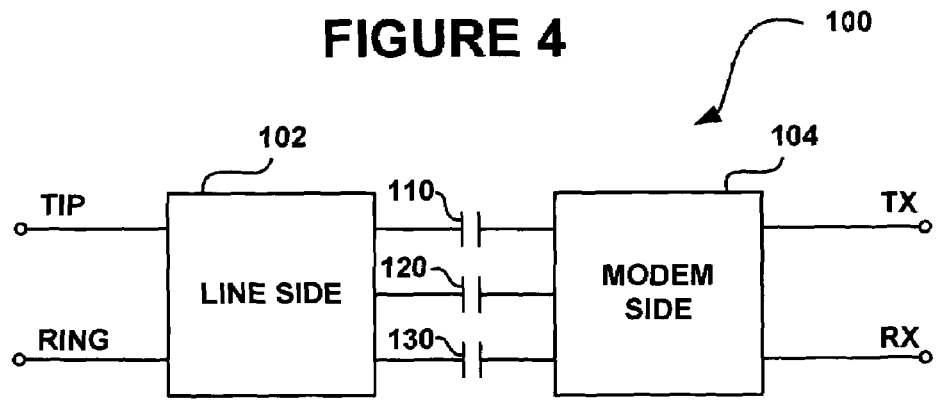

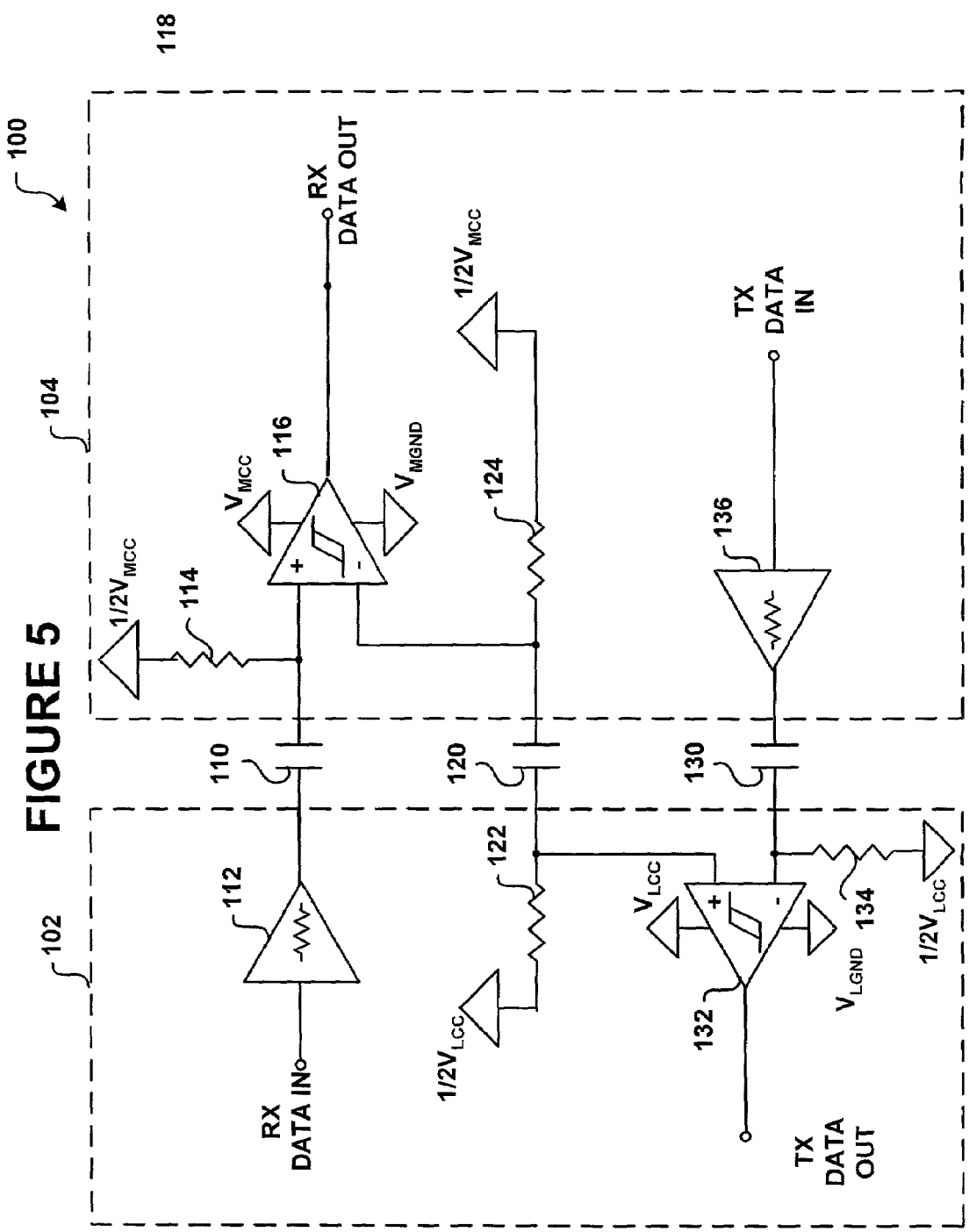

METHOD AND APPARATUS FOR ISOLATION IN A DATA ACCESS ARRANGEMENT USING ANALOG ENCODED PULSE SIGNALING

FIELD OF THE INVENTION

The present invention relates to data access arrangement (DAA) circuits. More specifically, it relates to the transmission of information across an isolation barrier in a DAA.

BACKGROUND OF THE INVENTION

DAAs are used to provide a dielectrically isolated interface between a telephone line pair (tip and ring pair) and a telephone device such as a modem or FAX machine. A DAA is typically divided into a line side circuit for interfacing to the tip and ring contacts and a modem side circuit for interfacing to the modem or computing equipment. FIG. 1 is a functional block diagram illustrating an example of a DAA 1 that includes a line side circuit 10 for interfacing with TIP and RING terminals and a modem side 30 for interfacing to data transmit TX and receive RX terminals. There are several functions which a DAA is generally required to perform.

Typically, the line side circuit of the DAA should present a controlled AC (alternating current) impedance of approximately 600 ohms. Another requirement is that the DAA draw a holding current in the range of 20 to 120 milliAmperes (mA) to signal an off-hook state at the tip and ring. In some countries, regulatory requirements are that the DAA needs to limit the holding current to 50–60 mA. By drawing the holding current from the telephone line, the DAA signals the central telephone office that it is active (off-hook) to either originate or answer a communications connection with the central office. A DAA also typically provides for ring detection and sometimes auxiliary line status functions; such as, line in use, loop current detection, line reversal detection, on-hook audio monitoring for Caller ID functions, etc. A DAA may also provide a 2–4 wire hybrid function. Finally, a DAA must provide all these functions across a high voltage dielectric isolation barrier.

In the on-hook state, the line side circuit typically may draw no more than a few milliamperes of current in order to avoid erroneously signalling the central office. In addition, for line maintenance, to facilitate identifying line leakage, telephone devices are required by regulation (the exact requirements depending on the country) to restrict on-hook DC resistance to typically over 1 Megaohms (MΩ), which limits the current available for on-hook functions to less than a few microamperes. For example, in the US, FCC part 68 limits on-hook DC resistance to over 5MΩ.

When off-hook, DAAs must provide a correct AC terminating impedance to the telephone line pair to allow proper central office two-to-four wire hybrid balance in order to minimize echoing. This leads to an impedance value, as noted above, of around 600 ohms in the United States and most of the world.

Another requirement of DAAs is to provide dielectric isolation between the telephone line voltages and the local ground potential because the telephone line pair power supply is usually geographically separated from the DAA and significant ground potential differences may arise. Consequently the telephone line pair ground potential is unterminated at the DAA. The DAA therefore isolates the line side circuit from the modem side circuit.

Also, the line side circuit must deal with a different scale of voltages from the modem side circuit. For example, the loop voltage on the line pair in the United States is typically −48 Volts Direct Current (VDC). The ringing voltage in the US is typically a 20 Hertz (Hz) 88 Volt RMS signal. Also, the line side circuit may be subject to overvoltage conditions that may arise due to lightning strike or a power line cross.

The modem side circuit, typically, operates at a supply voltage of, for example, 3 to 5 VDC and includes components that are subject to damage if exposed to the voltages present in the line side circuit. The DAA typically includes a two to four wire hybrid that provides first order transmit echo signal cancellation.

Consequently, the line side and modem side circuits are typically isolated from one another. One conventional approach to achieving isolation is to use a transformer, such as transformer 20 illustrated in FIG. 1, to separate the line side and modem side circuits. U.S. Pat. No. 5,369,666 to Folwell et al. for a Modem with Digital Isolation and U.S. Pat. No. 5,790,656 to Rahamin for a Data Access Arrangement with Telephone Interface, herein incorporated by reference in their entirety for all purposes, are two examples of approaches using transformers for isolation. Opto-isolators and capacitors are also used to provide an isolation barrier. U.S. Pat. No. 5,946,393 to Holcombe, herein incorporated by reference in their entirety for all purposes, shows an example of a DAA that can function with an opto-isolator. U.S. Pat. No. 5,500,895 to Yurgelites, herein incorporated by reference in their entirety for all purposes, shows an example of a DAA configured to function with capacitors that provide isolation. FIG. 2 illustrates an example of a DAA 40 that utilizes capacitors for isolation. A line side circuit of DAA 40 is AC signal coupled to a modem side circuit 44 via isolation capacitors 45, 48, 50 and 52.

U.S. Pat. No. 5,654,984 to Hershbarger et al. and U.S. Pat. Nos. 5,870,046; 6,107,948; and 6,137,827 to Scott et al., herein incorporated by reference in their entirety for all purposes, show further examples of DAA isolation techniques configured to function with capacitors that provide isolation wherein high-speed digital signals are used to transmit data across the isolation barrier. A DAA must transmit signals between the attached modem device and the telephone line pair. Transmitting signals across the isolation barrier is a significant challenge in the design of DAAs. The isolation barrier prevents direct coupling of signals between the line side and the modem side circuits. Also, the signals passed across the isolation barrier are subject to strong common mode noise signals.

For those skilled in the art, a wide variety of isolation techniques have been explored including, for example, bidirectional transformers, unidirectional transformers, modulated carriers with use of transformers, baseband bi-directional transformers, baseband bi-directional capacitors, or audio modulated sub-carriers. In some applications, analog signals are sent across the isolation barriers. In other applications digitized signals that represent discrete bits are transmitted across the barrier (as disclosed in the patents referenced above). Because analog baseband audio signals are in the low frequency range of 200 Hz–4 kHz, these frequency signals require large coupling devices for isolation in order to allow transmission. Small scale coupling devices may be used with higher frequency signals, but this requires modulating or encoding the baseband signal onto a high frequency carrier signal suitable for transmission across the isolation barrier. One method is to digitize the audio with a high data rate delta sigma bit stream and send these bits across the isolation barrier. See Hershbarger et al. and the patents of Scott et al. for examples of signals that are delta sigma converted for transmission. It is generally understood in the art that capacitive coupling of an encoded or carrier modulated signal is the lowest cost isolation solution because the capacitors required are of lower cost and smaller than other alternative coupling techniques.

However, discrete high voltage capacitors are relatively expensive devices, especially if they need to be highly matched, and, in addition, discrete component require assembly on a printed circuit board. Larger and more expensive than standard high voltage capacitors are those designed to meet standards of European Norm EN60950 or similar electrical safety standards since they must either (1) meet structural minimum insulation thickness requirements of 0.4 mm and minimum creepage distance of 2.5 millimeters or (2) if standard capacitors are used, multiple caps must be used and placed in series, thereby increasing cost and board area.

Although small capacitors, such as those which can be implemented on a circuit board are known to work, use of such capacitors requires highly specialized line powered design techniques to allow power up and line side on-hook operation without drawing excessive current from the telephone line pair. Large capacitors, over 300 pF, are used in some approaches to provide higher current levels to directly power both hook control and circuitry active when on-hook, but these larger devices incur greater cost and size limitations. In addition, due to the larger current levels of the signals sent across the capacitors, highly balanced differential drivers and highly balanced capacitors need to be used to prevent common mode noise exceeding regulatory limits.

When off-hook, one conventional approach to transmitting audio signals across the isolation barrier with good noise immunity involves encoding signals using pulse width modulation (PWM) encoding and transmitting the resulting edges across the isolation barrier using a differential amplifier. FIG. 3 is a functional block diagram illustrating the approach of U.S. Pat. No. 4,835,486 to Somerville, herein incorporated by reference in its entirety for all purposes, which shows an example of an isolation amplifier 60 used to transmit signals across a capacitive isolation barrier. Isolation amplifier 60 includes a PWM encoder 62 that encodes a digital data input signal to produce a PWM encoded digital signal that is input to differential driver 64. The resulting PWM encoded digital signal tends to have intermediate frequency content to the PWM encoded edges. These edges are differentially amplified by driver 64 that drives the resulting differential digital PWM signal across isolation capacitors 46 and 48, where they are received by differential receive amplifier 70. Differential receive amplifier 70 converts the differential digital PWM signal to a single ended received digital PWM signal that is input to comparators 72 and 74. Comparator 72 compares the single ended received digital PWM signal to a positive threshold voltage $V_{TH+}$ to produce a logical high signal input to a set terminal of SR flip-flop 76. Comparator 74 compares the single ended received digital PWM signal to a negative threshold voltage $V_{TH-}$ to produce a logical low signal input to a reset terminal of SR flip-flop 76. SR flip-flop 76 converts the output of comparators 72 and 74 into a received digital PWM signal at inverting and non-inverting outputs of flip-flop 76 that, in turn, drives a PWM decoder 78 that decodes the received digital PWM signal into a received digital signal.

The differential approach illustrated in FIG. 3, which is also typical of many prior art designs including U.S. Pat. No. 5,500,895 to Yurgelites, has several drawbacks. One obvious drawback is the requirement for two isolation capacitors to handle both sides of the differential signal transmitted from driver 64 to receive amplifier 70. The market for DAAs is highly competitive and the cost required for multiple isolation capacitors per signal path can undermine the competitiveness of the resulting design. Further, Yurgelites employs an amplitude modulation (AM) system that AM encodes an analog signal received at the telephone line pair. However, AM encoding has generally poor noise immunity and is vulnerable to aliasing from radio frequency signals, most notably from AM radio broadcast stations in the 550 kHz to 1650 kHz band. Low level radio frequency signals also produce audio heterodynes. Since high speed modems need signal to noise ratios of up to 80 dB, even very low level heterodynes can impair performance. In fact, it is this problem which requires that there be a very high level of balance on the capacitors, differential drivers, differential receivers, and board layout to minimize the effects of radio frequency interference.

The solution shown in Scott et al. teaches use of a line side powered digital coder/decoder (CODEC). Although a high speed modem DAA system typically requires a CODEC somewhere in the system, placing the CODEC on the line side adds design difficulties since the line side circuit needs both digital and complex analog circuits that must be powered from the telephone line pair. Also, these circuits all interact with one another and require great design care and specialized techniques to prevent unwanted interactions between the circuits and to prevent circuit load noise from getting back onto the telephone line pair. Holcombe's DAA patent teaches some of these techniques.

Another issue with solid state DAAs intended for use with high speed modems is that due to the fact that the line side is typically powered from the telephone line pair and is analog in nature, this circuit is more difficult to design and often requires more revisions than the modem side IC. Also, because of minimum operating voltage requirements and complex analog requirements, it is desirable to produce the line side circuit using a bipolar complementary metal oxide semiconductor (BICMOS) fabrication process with at least a 3V capability. This is because BICMOS processes provide the best mix of analog components; these being, high density capacitors, high density resistors with a wide resistance ranges, complementary bipolar transistors, and complementary MOS transistors. Use of a fabrication process with a minimum operating voltage of 3–5V is desirable since analog designs intended for operation at or below 2.4V require specialized low voltage design techniques which are not area efficient and are also performance limited in noise, dynamic range, power, bandwidth, etc. A BICMOS process which is cost or performance optimal for an analog design is often not cost or performance optimal for high density digital ICs. Commonly circuits fabricated using digital CMOS processes have lower maximum operating voltages, down to as little as 1.8V, and do not have the rich assortment of analog components available on BICMOS processes.

The present invention is directed toward an improved approach for transmitting signals across an isolation barrier.

SUMMARY OF THE INVENTION

An embodiment of a method for transferring information from a telephone line pair across an isolation barrier, according to the present invention, involves receiving an analog receive data signal from the telephone line pair, pulse-width-modulation (PWM) encoding the received analog receive data signal to a PWM encoded data signal that directly represents the received analog data signal, and driving the PWM encoded data signal across the isolation barrier. The method further recites receiving the PWM encoded data signal across the isolation barrier and decoding the received PWM encoded data signal. A further refinement of this embodiment calls for, in an on-hook state, converting the received analog receive data signal to a frequency encoded data signal and the step of pulse-width-modulation (PWM) encoding the received analog receive data signal further comprises PWM encoding the frequency encoded data signal to a PWM encoded data signal. In a still further refinement of this embodiment, the step of decoding the received PWM encoded data signal further comprises decoding the received PWM encoded signal into a digital count value. And in a yet still further refinement of this embodiment, the method further includes the step of directly processing the digital count value to perform one of ring detection, on-hook call monitoring, on-hook line voltage measurement, off-hook holding circuits, off-hook 2–4 wire hybrid, off-hook transmit and receive audio, and hook control.

An embodiment of a single-ended isolation circuit, according to the present invention, includes a first driver having an input terminal for receiving a first data signal and an output terminal for outputting the first data signal to a first terminal of a first isolation capacitor. The first driver is disposed in a line side circuit and configured to operate from a line side supply voltage. The circuit also includes a comparator having a non-inverting input terminal, an inverting terminal, and an output terminal. The first comparator is disposed in a modem side circuit and configured to operate from a modem side supply voltage. The non-inverting terminal of the comparator is configured to receive the first data signal from a second terminal of the first isolation capacitor and the inverting terminal is configured to be coupled to a first terminal of a second isolation capacitor. A first resistor is coupled between the non-inverting input terminal of the comparator and a reference circuit node configured to receive a modem side reference voltage. A second resistor is coupled between the inverting input terminal of the comparator and the reference circuit node. A third resistor is coupled between the output of the comparator and the non-inverting input terminal of the comparator. And a fourth resistor is coupled between a second terminal of the second isolation capacitor and another circuit node configured to receive a line side reference voltage. In a further refinement of this embodiment, the modem side reference voltage is selected to be at approximately a center of the modem side supply voltage and the line side reference voltage is selected to be at approximately a center of the line side supply voltage.

Another embodiment of an isolation circuit, according to the present invention, includes a driver having an input terminal for receiving a data signal from a line pair and an output terminal for outputting the data signal to a first terminal of an isolation capacitor, where the first driver is configured to operate from a first power supply voltage obtained from the line pair. The circuit includes an amplifier having a non-inverting and an inverting input terminal and an output terminal, where the non-inverting input terminal of the amplifier is configured to be coupled to a second terminal of the isolation capacitor, the amplifier being configured to operate from a second power supply voltage. A first resistor is coupled between the output terminal of the amplifier and the non-inverting input terminal of the first amplifier. A second resistor is coupled between the inverting input terminal of the amplifier and a circuit node configured to receive a reference voltage. And a third resistor is coupled between the non-inverting input terminal of the amplifier and the circuit node configured to receive a reference voltage. A further refinement of this embodiment of the present invention includes a pulse-width-modulation (PWM) encoder disposed between the line pair and the driver for PWM encoding the data signal to produce a aPWM encoded data signal for input to the driver, the PWM encoder having an input terminal for receiving the data signal and an output terminal coupled to the input terminal of the first driver for outputting the PWM encoded data signal to the driver. This refinement also includes a PWM decoder for decoding the PWM encoded data signal and output the first data signal, the PWM decoder having an input terminal for receiving the PWM encoded data signal from the output terminal of the amplifier and an output terminal for outputting the data signal. In a still further refinement, this embodiment further includes a voltage-to-frequency converter (VFC) disposed between the PWM encoder and the line pair and configured to convert the data signal to a frequency signal for input to the PWM encoder. And in yet still another refinement of this embodiment, the PWM decoder is configured to generate a digital count value and the circuit further includes a processor for receiving the digital count value and performing one of ring detection, on-hook call monitoring, on-hook line voltage measurement, off-hook holding circuits, off-hook 2–4 wire hybrid, off-hook transmit and receive audio, and hook control.

These as well as other features and advantages of the present invention will become apparent to those of ordinary skill in the art by reading the following detailed description, with appropriate reference to the accompanying drawings.

BRIEF DESCRIPTION OF DRAWINGS

The present invention is described herein with reference to the accompanying drawings, in which like numerals designate corresponding parts in the figures, wherein:

FIG. 3 is a high level circuit diagram illustrating an example of a conventional differential isolation circuit using capacitors for the isolation barrier;

FIG. 4 is a functional block diagram illustrating an embodiment of a DAA according to the present invention;

FIG. 5 is a high level circuit diagram illustrating an embodiment of a single-ended isolation circuit according to one aspect of the present invention;

DETAILED DESCRIPTION OF PREFERRED EMBODIMENTS

Figure 1:
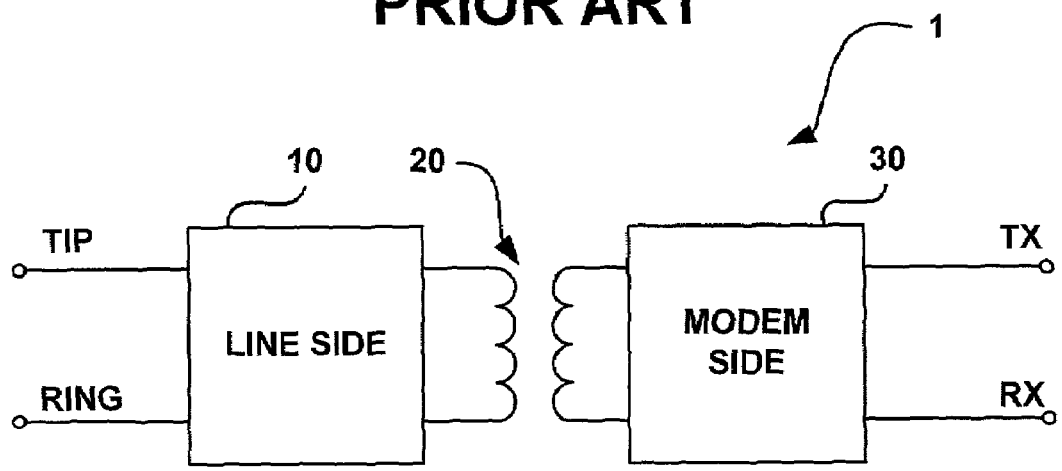
FIG. 1 is a functional block diagram illustrating an example of a conventional DAA using a transformer as an isolation barrier.
Figure 2:
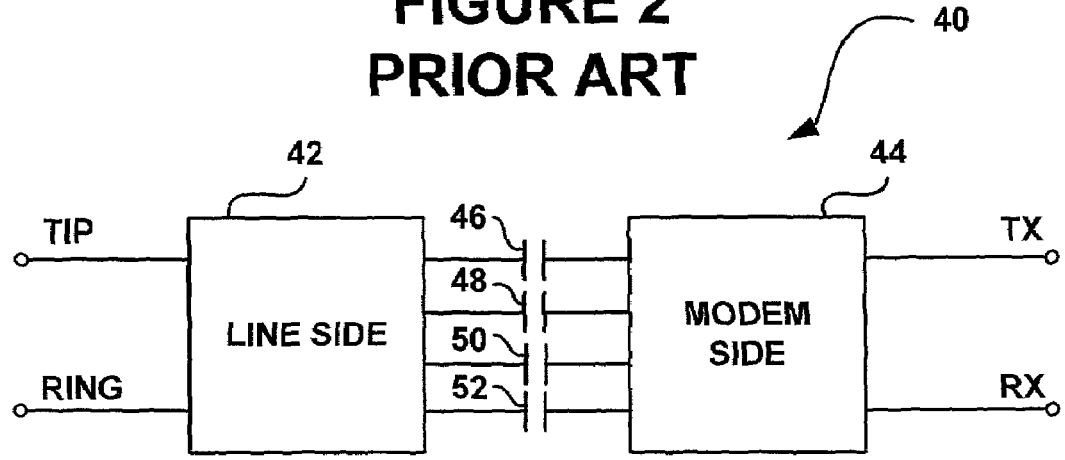
FIG. 2 is a functional block diagram illustrating an example of a conventional DAA using capacitors for the isolation barrier.

The present invention is directed toward a method and apparatus for transferring data across an isolation barrier using binary amplitude modulated pulses with fast edges. The analog information is encoded on edge timing via use of frequency modulation when on-hook and via use of pulse-width-modulation when off-hook. The binary amplitude modulated pulses are sent across capacitors with a single ended amplifier and may be received by either a single ended or differential amplifier.

Conventionally, it is well understood that converting analog signals to digital bits before sending them across a noisy communication channel (in this case the isolation capacitors) is one method to prevent incremental degradation of signals due to noise or distortion. Digital information bits may be encoded on the binary amplitude of a carrier signal or encoded on edge positions of transitions in a binary carrier signal. In order for bits to become corrupted, the noise or distortion on the communication channel has to be equal to at least one half the magnitude of the bit amplitude. For telephone systems, digitizing audio before sending it over the network is clearly superior to older analog systems in order to prevent degradation of signals when transported over vast distances and many communication links.

However, in the age of digital signaling design, it is now generally less well understood that analog information can be sent through a communication channel with very little degradation due to the effects of noise, if the bandwidth of the modulated carrier is very wide compared with the information signaling bandwidth. As an example, this principal is exploited in wide band FM systems and is responsible for the rapid demodulated noise quieting as a signal rises above the noise in the channel.

The present invention takes advantage of the fact that, in a capacitor isolated DAA fabricated with modern IC processes, the pulse carrier can have a bandwidth in excess of 1 GHz while, in contrast, the telephone signal information bandwidth is less than 4 kHz. The present invention uses very fast edged pulses to encode analog information on edge timing. There are a number of ways to analog encode edge timing on a binary amplitude pulse; such as frequency, phase, pulse width modulation, etc. In the present invention, on-hook signals are preferably encoded with frequency, for the reasons previously discussed, while off-hook signals are encoded with Pulse Width Modulation (PWM).

As an example of the noise immunity of PWM with very fast edges, typically the isolation capacitors would be driven with rail to rail pulses of 3–5 volts, depending on the power supply voltage. Noise signals cannot disrupt the signals unless they exceed one half the pulse voltage. Lower level noise can introduce pulse edge jitter, but these timing errors must always be less than the rise or fall time of the base carrier signal. Therefore, if analog information is encoded on the edge timing, it is desirable to minimize the edge speed (maximizing modulation bandwidth) and maximize the total edge timing range (minimizing information bandwidth). In a more specific example, if the pulse amplitude is 3V and the maximum range of edge timing is 10 microsecond and the rise/fall time of the edge is 300 pico seconds (e.g. an edge speed that is possible with modern IC processes), then noise can only introduce a maximum timing error of 1 part per 30,000. If the edge timing linearly encodes a voltage signal, this represents a 90 dB signal to noise ratio for a noise signal slightly less than 3V. For lesser noise signals, the signal to noise degradation decreases linearly.

The line side integrated circuit (IC) achievable with the present invention has a relatively simple structure easing design difficulties allowing minimum IC area without sacrificing performance. It has only two operating states, on-hook and off-hook, without a state for line monitoring, such as is used for performing caller identification (Caller ID).

The present technique allows the use of both the top and bottom of the printed circuit board to fabricate small essentially free capacitors which meet the isolation requirements of EN60950 even on very thin printed circuit boards (PCBs), such as those used on PCMCIA type modem cards. These capacitors are on the order of 0.3 pico Farad in value, and physically less than a few millimeters in diameter. Another advantage of these small capacitors is that they can be driven with a single ended driver because the coupling current is about 1000 times lower than the signal currents in capacitive DAAs, which typically use 300 pF capacitors. Consequently, the common mode AC currents are still an order of magnitude less than a highly balanced differential driver and capacitor pair consisting of matched 300 pF capacitors.

In the on-hook state, the present invention uses voltage-to-frequency conversion (VFC) to encode analog data relating to the telephone line pair. In the present invention, the duty cycle represents a polarity of the analog data signal, while a frequency of the pulses represents absolute magnitude. The VFC duty cycle is one of two states, where a duty cycle that is greater than 50% represents one polarity and a duty cycle that is less than 50% represents the opposite polarity. The frequency of the high speed pulses is used to represent the amplitude of the signal at T and R, such as 100 to 500 pulses per volt. The number of pulses per volt is selected to represent the amplitude with a sufficient frequency or sampling rate to pass direct current signals and resolve all ringing signals with adequate resolution.

An advantage of the VFC technique of the present invention is that a circuit may be configured such that the current required to transmit the signals representing the voltage magnitude will track the voltage available at T and R for powering the voltage-to-frequency conversion. Because the frequency of the resulting pulse signal is directly proportional to the absolute line voltage when the line side circuit is on-hook, current consumption of the V to F circuit is proportional to frequency, which, in turn, is proportional to the line voltage. This fact, combined with the use of small isolation capacitors, e.g. less than 1 pF, and also with the use of a relatively low frequency per volt conversion ratio, results in a low current per volt supply demand, which is required for on-hook line powered devices that must meet regulatory limits for on-hook current consumption.

Note that while the present invention has been discussed in the context of isolation capacitors, many of the techniques described herein may be adapted for use with other forms of isolation barriers in addition to isolation capacitors.

For example, assume a differential voltage-to-frequency circuit with 300 pF capacitors that is operating at 500 Hz/V. If the capacitors are driven with a 3 volt peak-to-peak (VPP) signal, then the minimum current consumed from the line will be 2×300 pF×500 Hz/V or 300 nA/V, which is equivalent to a 3.3 Megaohm (MΩ) effective DC load resistance. Such a circuit, not counting any other circuit current demands, would violate FCC part 68 on-hook leakage limits. By contrast, the present invention allows an effective impedance of 10 MΩ to be achieved that, with an on-hook voltage of 10V, results in an on-hook current consumption on the order of 1 μAmpere.

In the on-hook state, the present invention further reduces complexity by eliminating the need for ring detection circuitry. As noted above, in the on-hook state, the line side circuit sends an analog representation of the line voltage encoded as a voltage to frequency converted (VFC) signal that is proportional to the line voltage and whose polarity is encoded as duty cycle. In the modem side circuit, the VFC signal may be converted to a line voltage digital value signal by measuring its frequency with a digital counter. This approach has the advantage that the line voltage digital value signal may be directly processed by a digital signal processor (DSP) to determine line status. This approach is discussed further below with respect to FIG. 11.

Alternatively, the VFC signal received at the modem side circuit may be converted to an analog voltage signal that represents the line voltage signal at the telephone line pair. This approach has the advantage that a circuit operating according to the present invention may be used to directly replace a conventional isolation circuit configured to receive and output analog signals and may, therefore, be employed in combination with existing communications circuits configured to interface using analog signals.

In either case, once the modem side circuit has a representation of the line voltage in either digital or analog form, it can perform the ring detect signal processing. As another benefit of this method, because the absolute value and polarity of the line voltage is inherent in the signal sent to the modem side, it can directly report line voltage, useful for determining line status; whether the line is idle, dead, in use, ringing, or reversed (used for signaling Caller ID).

When in the off-hook state, the present invention sends PWM signals, such as dual slope PWM, across the isolation barrier that linearly represent the sampled analog signal at the T and R terminals of the telephone line pair. Like the on-hook voltage-to-frequency conversion, the analog approach of the present invention is simpler than other line DAA approaches and yields very high accuracy. The analog approach of the present invention can also produce a signal to noise ratio exceeding 90 dB and allows for either a simple conversion back to an analog signal on the modem side or direct digital measurement of the pulse width to directly convert to a digital value at the modem side. In fact, direct digital conversion with the method defined in the next patent is less complex than the standard delta sigma conversion used in many conventional solutions, such as those of Scott et al. and Hershbarger et al. noted above.

FIG. 4 is a high level functional block diagram illustrating an embodiment of a DAA according to the present invention. In FIG. 4, DAA 100 includes a line side circuit 102 for interfacing to the TIP and RING contacts of a telephone line pair. A modem side circuit 104 is isolated from the line side circuit 102 by isolation capacitors 110, 120 and 130. Modem side circuit 104 is configured to interface with a computer or other equipment to transmit and receive data to and from the telephone line pair. Note that the line side circuit typically operates from power supplied by the telephone line pair, where the ground is a floating ground that is approximately one diode drop greater than the most negative of the voltage at either TIP or RING.

FIG. 5 is a circuit diagram illustrating an example of a transmit path and a receive path across isolation capacitors using single ended amplifiers in accordance with one embodiment of the present invention. In line side circuit 102, an input terminal of complementary metal-oxide semiconductor (CMOS) driver 112 is coupled to a circuit node for receiving a receive input data signal RX DATA IN. CMOS driver 112 buffers RX DATA IN and outputs the buffered signal at an output terminal coupled to a first terminal of isolation capacitor 110, which, in this embodiment, is a 300 femtoFarad (fF) capacitor. Driver 112 is configured to operate from supply voltages that are derived from the TIP and RING terminals of the telephone line pair and are represented by supply voltages $V_{LCC}$ and $V_{LGND}$. One way to implement driver 112 is to construct a CMOS inverter that drives a resistor.

A second terminal of isolation capacitor 110 is coupled to a non-inverting input of a comparator 116, which resides in modem side circuit 104. Driver 112 drives the buffered signal across isolation capacitor 110 to hysteresis amplifier 116. Hysteresis amplifier 116 operates from a modem side supply voltage $V_{MCC}$ provided by a first supply voltage terminal and a modem side ground voltage GND provided by a second supply voltage terminal. The non-inverting terminal of comparator 116 is also coupled through 1 kΩ resistor 114 to a voltage reference terminal for providing a reference voltage level of the modem side supply voltage, such as $\frac{1}{2}V_{MCC}$, which serves as a threshold voltage for the comparison performed by hysteresis amplifier 116. The reference voltage is preferably a biasing voltage at approximately the middle of the signal swing of the incoming signal, which is reasonably approximated by $\frac{1}{2}V_{MCC}$. The selection of $\frac{1}{2}V_{MCC}$ is preferred because it provides for the maximum available common mode noise signal immunity in this embodiment. An inverting terminal of hysteresis amplifier 116 is coupled to one terminal of capacitor 120, which is also coupled to the reference voltage level, which is $\frac{1}{2}V_{MCC}$ in this embodiment, through resistor 124. It is preferable that the impedance of resistor 124 be matched to the impedance of resistor 114. Also, it is preferable that the impedance of driver 112 match the impedance of resistor 122. The benefit of matched impedances is to have good common mode noise signal rejection, where common mode noise generally enters the circuit through the floating ground potentials. Further, it is generally preferable that capacitors 110 and 120 have the same capacitance value.

CMOS driver 112 drives RX DATA IN across isolation capacitor 110 to hysteresis amplifier 116, in order to produce a receive data output signal RX DATA OUT at an output terminal of hysteresis amplifier 116. Isolation capacitor 110 acts as a high-pass filter for RX DATA IN as it passes from the line side circuit 102 to the modem side circuit 104. Capacitor 120 provides an alternating current (AC) signal return path from modem side circuit 104 to line side circuit 102.

Likewise, modem side circuit 104 includes a CMOS driver 136. An input terminal of CMOS driver 136 is coupled to a circuit node for receiving a receive input data signal TX DATA IN. CMOS driver 136 buffers TX DATA IN and outputs the buffered signal at an output terminal coupled to a first terminal of isolation capacitor 130, which, in this embodiment is a 300 fF capacitor and matches the capacitance of capacitor 120. The impedance of CMOS driver 136 is matched to the impedance of resistor 124 in the modem side circuit 104. A second terminal of isolation capacitor 130 is coupled to a non-inverting input of a single-ended amplifier/comparator 132, which resides in line side circuit 102. The non-inverting input of a hysteresis amplifier 132 is also coupled to a line side reference voltage, such as $\frac{1}{2}V_{LCC}$. The reference voltage is preferably a biasing voltage at approximately the middle of the signal swing of the incoming signal, which is reasonably approximated by $\frac{1}{2}V_{LCC}$.

Driver 136 drives the buffered signal across isolation capacitor 130 to hysteresis amplifier 132. Hysteresis amplifier 132 operates from the line side power supply voltage derived from the T and R terminals of the telephone line pair. The non-inverting terminal of comparator 132 is also coupled through resistor 134, which is preferably 1 kΩ, to the line reference voltage level ½$V_{LCC}$. A non-inverting terminal of comparator 132 is coupled to one terminal of capacitor 120, which is also coupled to the line side reference voltage through resistor 122. The impedance of resistor 122 preferably matches the impedance presented by resistor 134 for purposes of common mode noise rejection. Further, isolation capacitor 130 preferably has the same capacitance as isolation capacitor 120.

Note that the approach utilized in the embodiment of the present invention shown in FIG. 5 allows an isolation capacitor to be eliminated.

Figure 6:
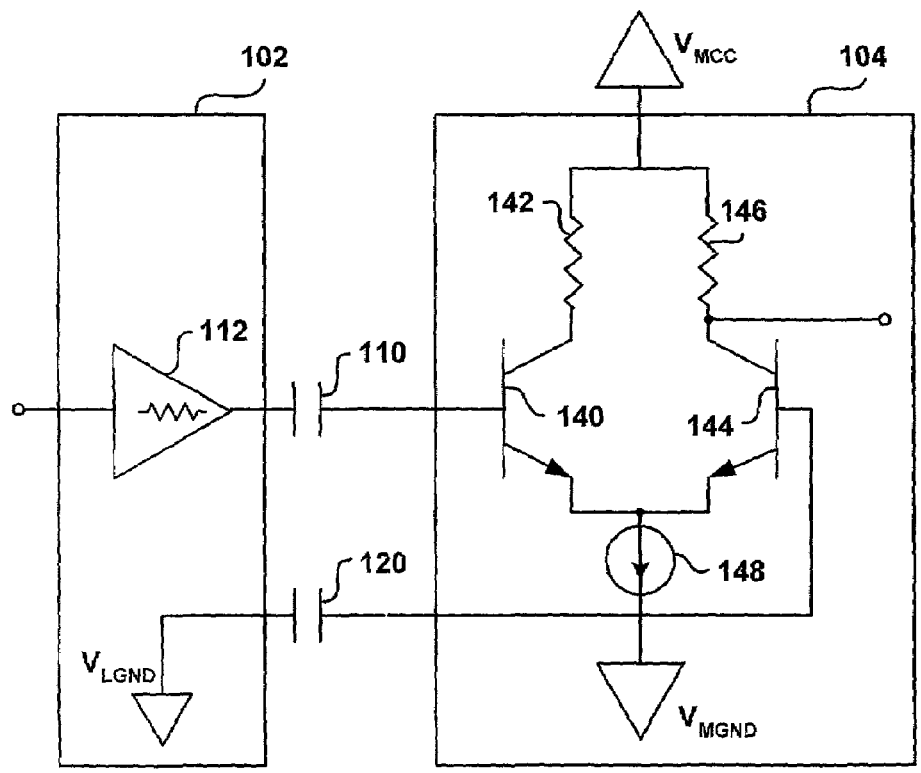
FIG. 6 is a circuit diagram illustrating one embodiment of an amplifier suitable for use in the single-ended isolation circuit of FIG. 5.

FIG. 6 illustrates an embodiment of the hysteresis amplifier 116 of FIG. 5. In FIG. 6, an amplifier 156 is provided with a positive feedback path through resistor 158 from an output terminal to a non-inverting input of the amplifier. Note in this embodiment, it is necessary to select resistance values for resistors 114 and 158 such that the combined resistance matches the impedance of resistor 124 for common mode noise rejection. Other embodiments of hysteresis amplifiers and similar devices are well understood in the art. For example, Schmitt triggers operate with hysteresis as do amplifiers designed with local feedback using a current source. Additional examples of hysteresis amplifiers and comparators that may be adapted for use in the present invention are described in Chapter 7 of Allen and Holberg, *CMOS Analog Circuit Design*, Holt, Rinehart and Winston, 1987, (ISBN 0-03-006587-9), herein incorporated by reference for all purposes.

Figure 7:
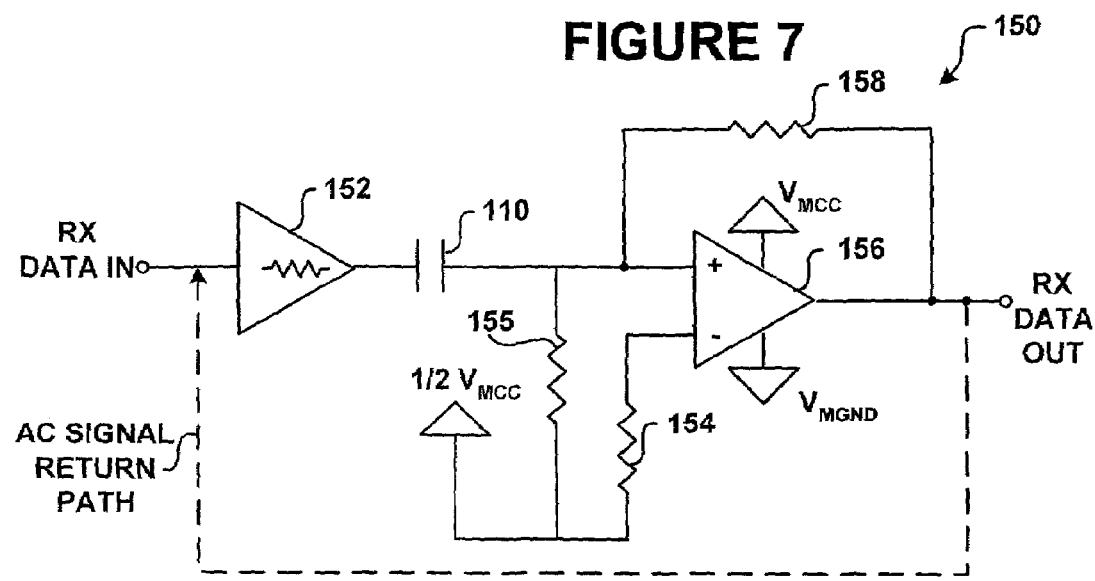
FIG. 7 is a high level circuit diagram illustrating an embodiment of a single-ended isolation circuit according to another aspect of the present invention.

FIG. 7 illustrates another embodiment of an isolation circuit 150 according to the present invention, where an AC signal return path is provided through AC coupling due to an antenna effect from an output of the modem side circuit back to the line side circuit. In FIG. 7, a CMOS driver 152 drives receive data input signal RX DATA IN across isolation capacitor 110. The modem side circuit includes a hysteresis amplifier 159 that operates from $V_{MCC}$ and $V_{MGND}$ for the modem side circuit. The non-inverting input of amplifier 159 is coupled to the modem side reference voltage, which is ½$V_{MCC}$ in this embodiment, through resistor 155. An inverting input of amplifier 159 is also coupled through resistor 154, which is preferably a 1 kΩ resistor in this embodiment, to the modem side reference voltage of ½$V_{MCC}$. The impedance of resistor 155 and preferably matches the impedance of resistor 154 for common mode noise rejection.

The hysteresis amplifier 159 acts regeneratively, so that once the non-inverting input of the amplifier is driven to a logic state, e.g. above or below the threshold level provided by the modem side reference voltage, e.g. ½$V_{MCC}$, the output of the amplifier latches the state of amplifier at that logic state. Thus, when a high going edge passes through isolation capacitor 110, the non-inverting input of amplifier 159 is driven above the modem side reference voltage, then the output of amplifier 159 goes to a high voltage level, and the feedback from the output to the non-inverting input latches the output of amplifier 159 at the high voltage level. Likewise, when a low going edge passes through isolation capacitor 110, the noninverting input of amplifier 159 is driven below the modem side reference voltage, then the output of amplifier 159 goes to a low voltage level, and the feedback from the output to the non-inverting input latches the output of amplifier 159 at the low voltage level. In other words, the output of amplifier 159 will swing from one supply voltage rail to the other supply voltage rail in response to the edges receives at the non-inverting input of amplifier 159.

In the embodiment of the present invention shown in FIG. 7, the signal transferred from driver 152 to amplifier 159 must have a sufficiently high AC frequency content to provide AC signal coupling between the RX DATA OUT terminal of the modem side circuit and the RX DATA IN terminal of the line side circuit. For example, the frequency content of the signal may be approximately 300 MHz. At sufficiently high frequencies, the signal trace wire for coupling the output of amplifier 159 to the RX DATA OUT terminal of the modem side circuit will act as a transmit antenna that radiates back an AC return signal to the signal trace wire coupling the RX DATA IN terminal of the line side circuit to the input of driver 152. Note that the circuit diagram of FIG. 7 illustrates a receive path from the line side to the mode side through an isolation capacitor and that another isolation signal path circuit would be provided for a signal path in the transmit direction from the modem side to the line side through another isolation capacitor.

As noted above, one consideration in the design of the present invention is common mode noise signal sources. The approach to reducing problems associated with common mode noise that is common to many conventional designs is the use of differential drivers to drive the data signal across the isolation barrier. As discussed above, this typically results in at least two isolation capacitors being required for transmission in each direction, e.g. line side to modem side and mode side to line side. The largest sources of common mode noise on a telephone line pair tend to be low frequency signals, such as power lines, and intermediate frequency signals, such as AM radio stations. Low and intermediate frequency signals tend to have very large quarter wavelength values, which is the length required for efficient antenna transmission. In the present invention, the high pass filter formed by the isolation capacitor 110 and resistor 154 is selected such that the low and intermediate frequencies typical of common mode noise sources are blocked by the high pass filter. Also, the high frequency that is used to transmit data across the isolation barrier in the present invention also results in a relatively small quarter wavelength. Thus, the small signal trace for the output terminal, e.g. RX DATA OUT, is sufficient to achieve good AC coupling to the small signal trace for the input terminal, e.g. RX DATA IN. However, because the amount of energy radiated for the AC return path is nonetheless quite small, the resulting circuit will generally meet most electro-magnetic interference (EMI) and PTT restrictions on environmental radiation.

Figure 8:
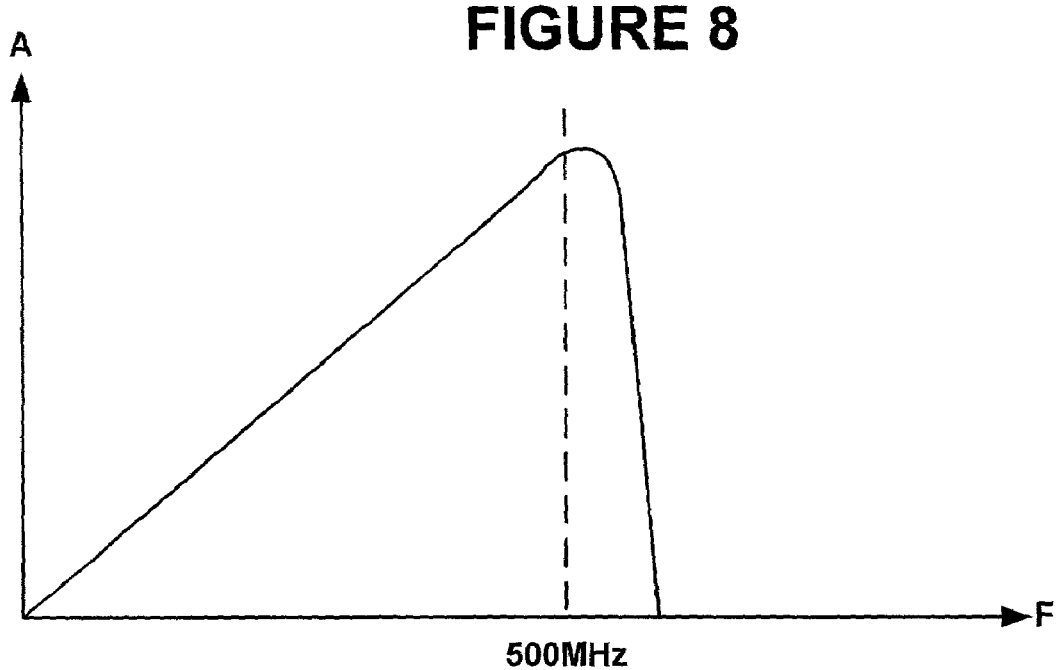
FIG. 8 is a frequency response diagram illustrating the operation of the isolation circuit of FIG. 7.

FIG. 8 is a signal response graph representing an example of the signal response of the signal path of FIG. 7. The signal response curve for the signal path of FIG. 7 increases with frequency until it reaches a 3 decibel (dB) point determined by the resistance-capacitance (RC) constant of resistor 154 in combination with capacitor 110. In this example, the 3 dB point is at approximately 500 MHz. For frequencies higher than 500 MHz, the response curve drops due the inability of the active devices, e.g. transistors, in the circuit path to switch fast enough to accommodate the signal frequency.

Figure 9:
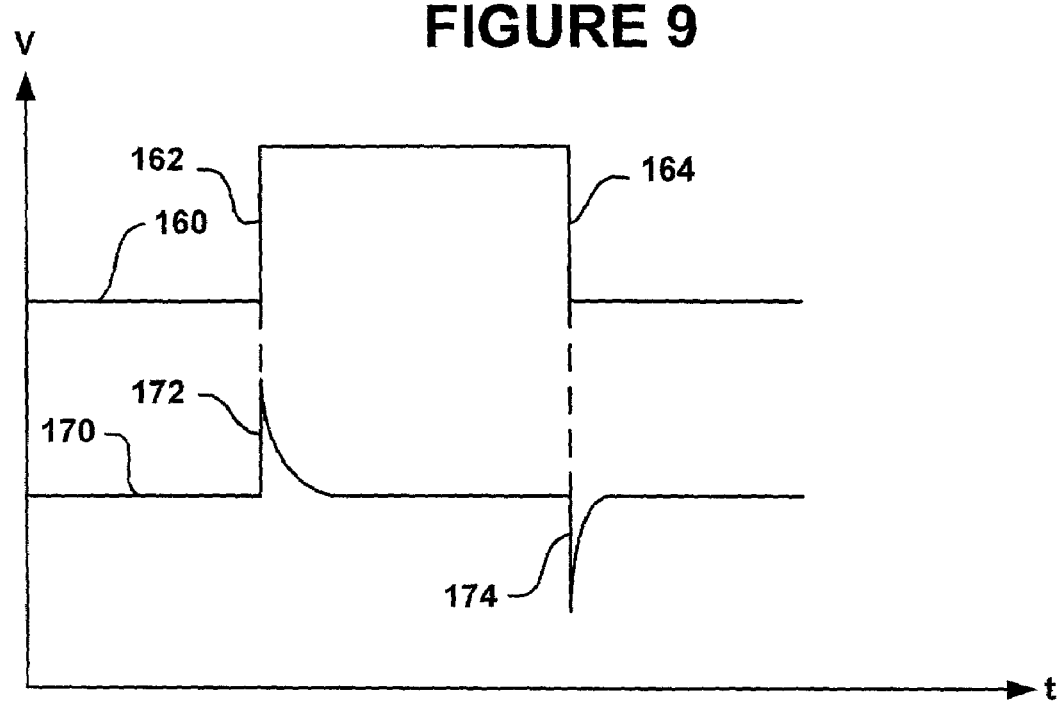
FIG. 9 is a waveform diagram illustrating the operation of the isolation circuit of FIG. 7.

FIG. 9 is a waveform diagram illustrating an example of a data signal 160 output by driver 152 and a resulting signal 170 that results from driving the data signal 160 across capacitor 110. A rising edge 162 of data signal 160 results in a high-going spike 172 in resulting signal 170. Conversely, a falling edge 164 of data signal 160 results in a low-going spike 174 in resulting signal 170. The frequency content of edges 162 and 164 must be sufficiently high to pass across the isolation capacitor 110 and also provide antenna coupling between the output terminal RX DATA OUT and input terminal RX DATA IN.

Figure 10:
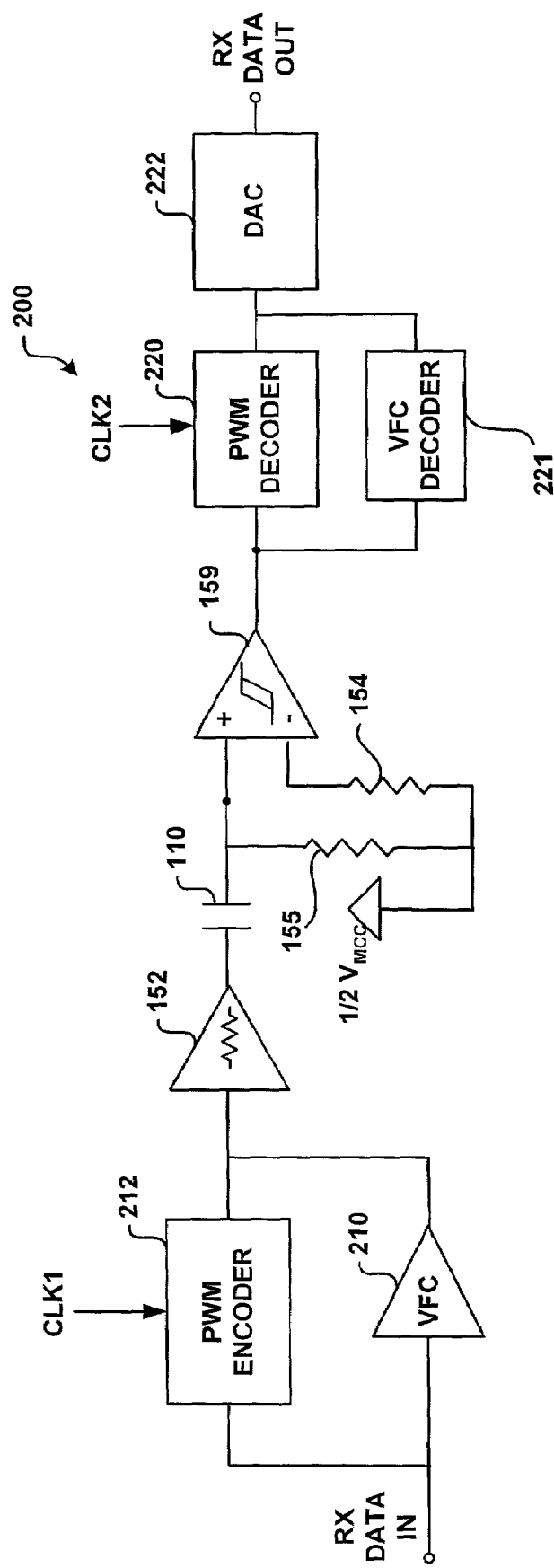
FIG. 10 is a high level circuit diagram illustrating an embodiment of a single-ended isolation circuit according to yet another aspect of the present invention.

FIG. 10 is a functional block diagram illustrating another embodiment of an isolation circuit 200, according to the present invention, which combines the single-ended amplifier circuit of FIG. 7 with voltage-to-frequency conversion as well as pulse width modulation (PWM) encoding. On a line side portion of isolation circuit 200, voltage-to-frequency (VFC) encoder 210 converts an analog voltage received at RX DATA IN of the circuit 200, which is obtained from the tip and ring terminals of the line pair, into a corresponding frequency encoded signal for detecting activity on the line pair during an on-hook state of the circuit. VFC encoder 210 may also receive an additional control input for disabling the VFC encoder during an off-hook state of the circuit.

VFC encoder is coupled in parallel to PWM encoder 212, which also receives RX DATA IN and receives a clock signal CLK1 that is used to encode the signal. PWM encoder 212 may also receive an additional control signal for disabling the PWM encoder during the on-hook state. PWM encoder 212 encodes the analog signal RX DATA IN received in the off-hook state for input to driver 152, which drives the PWM encoded signal across isolation capacitor 110. The clock signal CLK1 is selected such that the resulting PWM encoded signal includes edges having sufficiently high frequency content to pass across isolation capacitor 110.

On a modem side portion of isolation circuit 200, the frequency encoded signal or the high speed edges of the PWM encoded signal driven across isolation capacitor are received at a non-inverting input terminal of hysteresis amplifier 159. Hysteresis amplifier 159 compares the signals received across the isolation capacitor to $\frac{1}{2}V_{MCC}$ in order to recover the transmitted signal.

During the on-hook state VFC decoder 221 is enabled in order to decode the frequency encoded signal. The decoded signal reflects the analog voltage signal RX DATA IN observed on the tip and ring of the line pair during the on-hook state.

During the off-hook state, the PWM encoded signal is decoded by PWM decoder 220, which is driven by clock signal CLK2 and converts information encoded in the edges of the PWM encoded signal into a value reflecting the voltage that is received at T and R on the line side of isolation circuit 200.

As noted above, there are two preferred approaches to processing the signal output from PWM decoder 220. VFC decoder 221 and PWM decoder 220 each output a digital count value that represents a magnitude of the analog voltage received at the line pair terminals T and R. This digital count may be processed directly by a digital processor, such as a DSP, to interpret the analog voltage signal. Alternatively, for an analog chip set, the digital count value may be converted back to an analog signal using digital to analog converter (DAC) 222 for output to conventional modem circuits. DAC 222 may be eliminated if the digital count value is to be process by a DSP.

Figure 11:
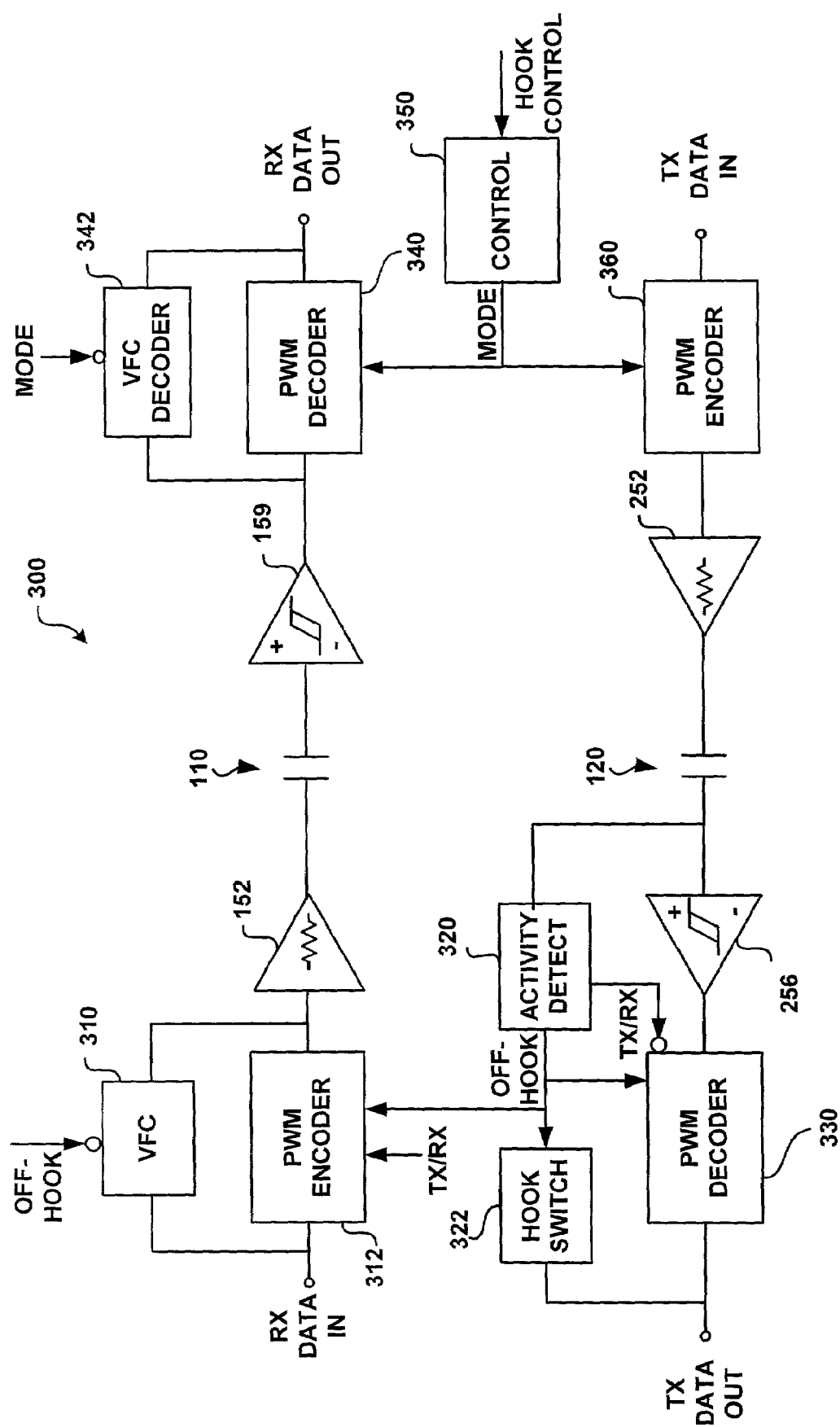
FIG. 11 is a high level circuit diagram illustrating an embodiment of a bi-directional communication system according to still another aspect of the present invention utilizing the single-ended isolation circuit of FIG. 10.

FIG. 11 is a simplified block diagram of an embodiment of a bi-directional communication circuit 300 utilizing a version of the isolation circuit design of FIG. 10 that permits a two isolation capacitors 110 and 120 to be utilized. Bi-directional circuit 300 includes isolation circuit 200 to transmit received data from the line side to the modem side.

In FIG. 11, on the line side of the circuit, VFC encoder 310 receives an OFF-HOOK signal generated by an activity detector circuit 320. PWM encoder 312 also receives the OFF-HOOK signal as well as a TX/RX state control signal that is generated by activity detector 320. The OFF-HOOK signal also drives a hook switch circuit 322. Both the OFF-HOOK signal and the TX/RX signal drive PWM decoder 330.

Activity detector 320 monitors an activity level of the signal received from isolation capacitor 110. In the on-hook state, the OFF-HOOK signal is at a low logic level that enables VFC encoder 310, but disables PWM encoder 312, hook switch 322, and PWM decoder 330. Thus, in the on-hook state, VFC encoder 310 converts the analog voltage signal RX DATA IN received from the tip and ring to a frequency encoded signal that is driven across isolation capacitor 110.

On the modem side of circuit 300, PWM decoder 340 and VFC decoder 342 are coupled in parallel and both receive the output of hysteresis amplifier 159 and output a received data signal at RX DATA OUT. Both also receive a MODE control signal received from control circuit 350. PWM encoder 360 receives a transmit data signal TX DATA IN for output to driver 252 and transmission across isolation capacitor 110. PWM encoder 360 also receives the MODE control signal from control circuit 350. Control circuit 350 receives a HOOK CONTROL signal generated by a processor or an external circuit. Control circuit maintains the MODE signal at a low logic level in the on-hook state, which enables VFC decoder 342 and disables PWM decoder 340 and PWM encoder 360. Control circuit 350 switches the MODE signal to a high logic level in response to the HOOK CONTROL signal, which disables VFC decoder 342 and enables PWM decoder 340 and PWM encoder 360.

While in the on-hook state, an on-hook analog signal at RX DATA IN, such as a ring signal, will be frequency encoded by VFC 310, which will output the frequency encoded signal to driver 152 for transmission across isolation capacitor 110. Hysteresis amplifier 159 recovers the transmitted frequency encoded signal and outputs it to VFC decoder 342. which decodes the transmitted frequency encoded signal into a received on-hook analog signal that is output from the DAA to a processor or external control circuit.

The processor or external control circuit detects the ring signal and asserts the HOOK CONTROL signal. This causes control circuit 350 to switch the MODE signal to the off-hook state, which disables VFC decoder 342 and enables PWM decoder 340, in this embodiment. PWM encoder 360 responds to activation of the MODE signal by beginning a cycle of generating a start signal, waiting a first predetermined time interval, and then encoding the TX DATA IN signal during a second predetermined time interval. The output of PWM encoder 360 is received by driver 252, which drives the signal across isolation capacitor 120.

Activity detector 320 integrates the activity that it receives over a given time period, e.g. 100 microseconds, and, if it surpasses a predetermined threshold, switches the state of the OFF-HOOK signal from on-hook to off-hook. This disables VFC encoder 310 and activates the hook switch circuit, which begins to draw sufficient current to signal an off-hook onto the tip and ring of the line pair. Activity detector also enables PWM encoder 312 and PWM decoder 330, but these circuits are also controlled by the TX/RX signal. Activity detector 320 also begins driving the TX/RX signal when it detects activity. In this embodiment, the activity detector 320 will change the state of the TX/RX signal each time it receives a rising edge. PWM encoder 312 and PWM decoder 330 are configured to respond to the TX/RX control signal in a complementary manner, which results in just one or the other being active during any given time interval.

Figure 12:
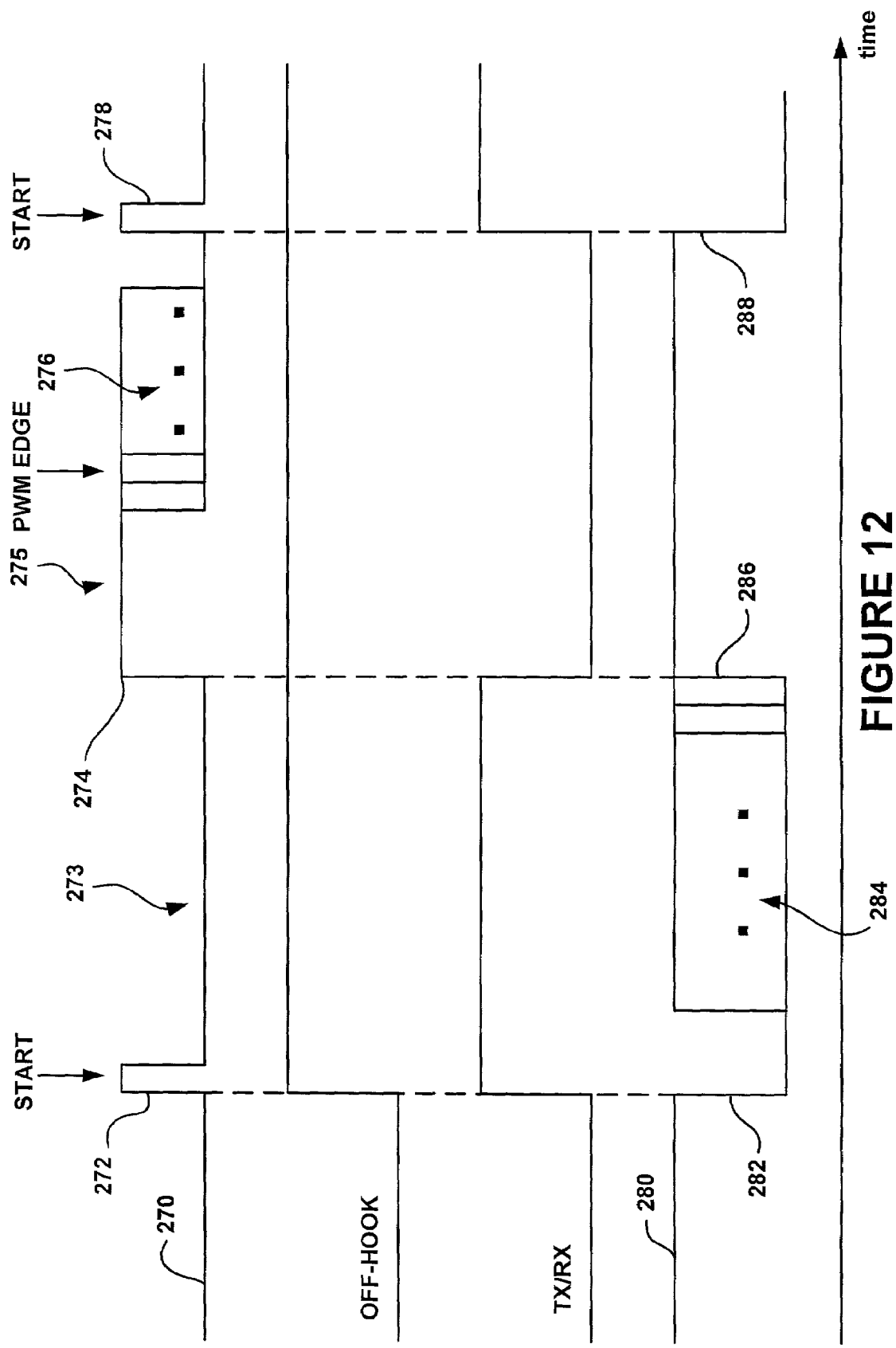
FIG. 12 is a waveform diagram illustrating an example of the operation of the communication system of FIG. 11.

FIG. 12 is a waveform diagram illustrating one example how the circuit of FIG. 11 may function. In FIG. 12, control circuit 350 switches the state of the MODE signal responsive to activation of the HOOK CONTROL signal. This causes modem side PWM encoder 360 to begin transmitting a repetitive transmit sequence 270 that includes a start signal 272, followed by the first predetermined time interval 273 for receiving data from the line side, and then followed by the second predetermined time interval 275 for encoding the TX DATA IN signal for transmission to the line side, which begins with rising edge 274. The transmit sequence then repeats beginning with start pulse 278, which also marks the end of the second time interval 275.

Activity detector 320 monitors the rising edges that it receives from the interface with isolation capacitor 120. The activity detector may, for example, start a timer or trigger a one-shot responsive to a rising edge and count the number of rising edges received within a predetermined period of time. If the count exceeds a preset threshold, then the activity detector asserts the OFF-HOOK signal that disables VFC encoder 310 and enables line side PWM encoder 312 and line side PWM decoder 330. In FIG. 12, OFF-HOOK is shown going high in response to the rising edge of start pulse 272. However, a typical implementation would require that a series of start pulses be received by activity detector 320 before the preset threshold is hit and the OFF-HOOK signal is asserted, which will generally be satisfied by the preamble sequences frequently provided for in communications protocols.

Also note that activity monitor 320 will begin toggling the TX/RX signal responsive to each rising edge. This is demonstrated in FIG. 12, where TX/RX toggles responsive to the rising edge of start pulses 272 and 278, but also at the rising edge 274 that marks the end of the receive time interval 273 and the beginning of the transmit time interval 275.

When TX/RX is high, line side PWM encoder 312 is enabled to encode the receive analog voltage signal at the tip and ring of the line pair into a PWM encoded receive signal that is driven across isolation capacitor 110. The amplitude of the analog voltage signal is encoded in the position of edge 284 in the receive train 280 shown in FIG. 12. When rising edge 274 arrives, then TX/RX toggles to a logic low level, which disables line side PWM encoder 312 and enables line side PWM decoder 330. Line side PWM decoder 330 then receives and decodes the transmitted data signal 270 transmitted during interval 275 by modem side PWM encoder 360, which encodes the transmit data signal at TX DATA IN in PWM edge 276. PWM decoder 330 may include a digital to analog converter that converts a digital count obtained from decoding the PWM edge into an analog signal for transmission onto the line pair at TX DATA OUT.

Note that communication by controlling transmission in both directions, in the maimer described with respect to FIG. 12, results in data transfer is active in only one direction at any given time. This aspect of this embodiment, where data is repeatedly transmitted first in one direction, then in the return direction, may be adapted to permit transmission and reception of data to be multiplexed or "ping-ponged" through a single isolation capacitor. This approach may permit another one of the isolation capacitors to be eliminated in some applications. Thus, the number of isolation capacitors in a bi-directional isolation circuit according to the present invention may be reduced to one.

However, to multiplex transmit and receive data through a single isolation capacitor, activity monitor 320 must be adapted to account for the frequency encoded data signal that may be generated by VFC 310. One way to adapt the activity monitor is to cause it to detect the origination of signals from the VFC 310 and blank out those signals for a time interval or to detect that the received signal corresponds to a ring frequency signal or Caller ID signal. Also, the activity monitor must be configured to accommodate the reception of both the receive train 270 and the transmit train 280. This may be accomplished by a more complex counting algorithm for rising edges, e.g. count two rising edges in the transmit state before switching, or by disabling the input to the activity monitor, e.g. blanking, for a predetermined time interval corresponding to the transmit period, or by timing state transitions from the start pulse.

Another advantage of the "ping-pong" method is that it avoids digital switching cross talk noise problems between the transmit and receive channel. One of the problems with analog to PWiM conversion is that, because the pulse width timing is typically generated by comparing a ramp crossing the analog signal level, a low level digital transient can cause early comparator detection. The only uncontrolled digital noise source on the line side IC during this analog to PWM conversion would be the PWM signal in the other direction, if PWM signals were being sent in both directions at the same time. However, by using the "ping-pong" technique this problem can be avoided.

Also note that the approach of the present invention when on-hook may be used to transmit a VFC encoded signal reflecting the analog voltage signal present at the tip and ring of the telephone line pair. Referring back to FIG. 10, the analog voltages at T and R are converted to a frequency data signal by VFC 210 and then sent as binary amplitude modulated fast edge signal across isolation capacitor 110 to the modem portion of circuit 200. Frequency decoder 221 may be configured to output a digital value or count that corresponds to the analog voltage signal at T and R. Thus, a digital signal processor (DSP) may process the analog voltages observed at T and R to determine the activity at the line pair. The DSP can make a wide variety of determinations by observing the analog voltages at T and R. For example, the DSP can detect when a switch-hook takes place, detect the presence or absence of a ring voltage signal, or capture and decode caller identification data (Caller ID).

Using the approach of the present invention, the analog circuit elements necessary to interface to the telephone line pair T and R can be reduced to a relatively small number that can be fabricated into a small integrated circuit, allowing large numbers of chips to be obtained from a wafer during fabrication and thereby reduce costs. Furthermore, line interface cards and similar equipment often already include a DSP device that can be programmed to interface with the small integrated circuit containing the analog circuit elements, so that costs can be further reduced by moving more functionality into the existing DSP device. Still further, the same analog interface chip may be used to interface to telephone lines conforming to a variety of different regulations, with the different regulations being accommodated by changing the software for the DSP. Thus, the present invention provides for a high degree of flexibility and cost reduction for telephone interface designs.

Using the present invention, a lower cost modem DAA can be more quickly developed by minimizing the line side circuit complexity, which may then be produced using a lower resolution BICMOS process, while much of the complexity of the overall circuit is transferred to the modem side circuit, which may be fabricated in a higher resolution digital IC process.

Although it is apparent that it is desirable to minimize line side complexity, because of the many functions required to be performed by modem DAAs, many commercially available modem DAAs either have significant line side complexity or those that have lower complexity achieve lower complexity by excluding certain functions which then need to be added externally at extra cost and PCB area. For example, in most solid state DAAs, the line side circuit has separate circuit blocks to perform ring detection, on-hook call monitoring, on-hook line voltage measurement, off-hook holding circuits, off-hook 2–4 wire hybrid, off-hook transmit and receive audio, and hook control. In digital DAAs, these functions include A-D and D-A blocks, some of which may be different between on-hook, off-hook, and call monitoring states. The number of these blocks create difficulties and design effort at a level significantly greater than is proportional to their number due to the complex interactions and interdependencies between these blocks. In fact, line side DAA circuits are often some of the most complex analog and mixed signal integrated circuits in commercial production. Their development time is so great that commonly, by the time an integrated circuit is developed, the fabrication process for which it was developed is one generation behind the most current process. This complexity also makes it very difficult and risky to port the design to a new fabrication process. Therefore, the present invention makes it possible to reduce the number of circuit blocks and operating modes on the line side circuit of the DAA in order to reduce cost and development time.

While PWM is described above as the preferred embodiment, one of ordinary skill in the art will readily recognize that other approaches to encoding analog signals from the T and R terminals for the telephone line pair may be used in combination with the present invention. For example, pulse position modulation (PPM) may be used. PPM generally produces fast edges for noise immunity, but requires the recovery of a phase reference signal. Frequency modulation (FM) possesses good noise immunity, but requires a frequency discriminator. Amplitude modulation (AM), quadrature amplitude modulation (QAM), pulse amplitude modulation (PAM), and other amplitude modulation approaches may be employed, but suffer from aliasing problems and require a high level of common mode balance.

The present invention is directed to an isolation approach that employs single-ended signal transmission techniques rather than the differential signal transmission techniques commonly employed in conventional isolation circuits. Another aspect of the present invention is that analog signals present at the tip and ring of the telephone line pair may be encoded and transmitted across the isolation barrier for processing by a DSP.

In view of the wide variety of embodiments to which the principles of the present invention can be applied, it should be understood that the illustrated embodiments are exemplary only, and should not be taken as limiting the scope of the present invention. For example, a variety of converter elements and PWM encoders may be utilized to perform certain functions of the present invention. Also, the function of some circuit elements may be combined into a single device while the function of other circuit elements may be implemented so as to be performed by multiple devices. For example, the ADC device 222 in FIG. 10 may not be necessary in some applications depending upon the needs of the DSP and the output of the PWM decoder selected for the application. Also, certain aspects of the embodiments shown, such as the function of communication controller 260, may be implemented alternatively in software, hardware or firmware or a combination thereof, including implementation within software executing in an external DSP device.

The invention is not limited to the precise embodiments shown herein. Therefore, all embodiments that come within the scope and spirit of the following claims and equivalents thereto are claimed as the invention.

We claim:

1. A method for transferring information from a telephone line pair across a capacitive isolation barrier, the method comprising the steps of:
   receiving an analog receive data signal from the telephone line pair;
   pulse-width-modulation (PWM) encoding the received analog receive data signal to a PWM encoded data signal that directly represents the received analog data signal;
   driving the PWM encoded data signal across the capacitive isolation barrier using a single-ended driver with a reference voltage that is substantially half of a line side power supply voltage derived from the telephone line pair;
   receiving the PWM encoded data signal across the capacitive isolation barrier; and
   decoding the received PWM encoded data signal.

2. The method of claim 1, where the step of decoding the received PWM encoded data signal further comprises decoding the received PWM encoded signal into a digital count value.

3. The method of claim 1, where the step of PWM encoding further includes PWM encoding using a clock rate of at least 300 MHz.

4. The method of claim 1, where the step of receiving the PWM encoded data signal across the capacitive isolation barrier further comprises recovering the PWM encoded signal transmitted across the capacitive isolation barrier using a hysteresis amplifier.

5. The method of claim 1, the method further including the steps of:
   receiving a digital transmit data signal;
   converting the digital transmit data signal to a PWM encoded transmit data signal;
   driving the PWM encoded transmit data signal across the capacitive isolation barrier using another single-ended driver;
   receiving the PWM encoded transmit data signal across the capacitive isolation barrier;
   decoding and converting the PWM encoded transmit data signal to an analog voltage transmit data signal.

6. The method of claim 5, where the step of decoding and converting the PWM encoded transmit data signal into an analog voltage transmit data signal further comprises:
   decoding the PWM encoded transmit data signal into the digital transmit data signal; and
   converting the digital transmit data signal into the analog voltage transmit data.

7. The method of claim 5, where the method further includes controlling the transfer of the analog receive data signal and transmit data signal such that only one of the analog receive data signal and digital transmit data signal is transmitted across the capacitive isolation barrier at any given time.

8. The method of claim 7, where:
the step of driving the PWM encoded data signal across the capacitive isolation barrier further comprises driving the PWM encoded data signal across a single isolation capacitor; and
the step of driving the PWM encoded transmit data signal across the capacitive isolation barrier further comprises driving the PWM encoded transmit data signal across the single isolation capacitor.

9. A method for transferring information from a telephone line pair across a capacitive isolation barrier, the method comprising the steps of:
receiving an analog receive data signal from the telephone line pair;
pulse-width-modulation (PWM) encoding the received analog receive data signal to a PWM encoded data signal that directly represents the received analog data signal;
driving the PWM encoded data signal across the capacitive isolation barrier;
receiving the PWM encoded data signal across the capacitive isolation barrier; and decoding the received PWM encoded data signal,
where the step of pulse-width-modulation (PWM) encoding the received analog receive data signal further comprises PWM encoding the received analog data signal to a PWM encoded data signal in an off-hook state and the method further includes the steps of:
converting the received analog receive data signal to a frequency encoded data signal in an on-hook state;
receiving the frequency encoded data signal across the capacitive isolation barrier; and
decoding the received frequency encoded data signal into a digital count value during the on-hook state.

10. The method of claim 9, the method further including the step of directly processing the digital count value to perform one of ring detection, on-hook call monitoring, on-hook line voltage measurement, off-hook holding circuits, off-hook 2–4 wire hybrid, off-hook transmit and receive audio, and hook control.

11. The method of claim 10, the method further including the step of converting the digital count value to an analog output signal for output to a modem circuit configured to receive analog input signals.

12. An isolation circuit, the circuit comprising:
a single-ended driver, the driver having an input terminal for receiving a first data signal and an output terminal for outputting the first data signal to a first terminal of a first isolation capacitor, the driver being disposed in a line side circuit and configured to operate from a line side supply voltage, wherein the driver has another input terminal for receiving a reference voltage that is substantially half of the line side supply voltage;
a hysteresis amplifier, the hysteresis amplifier having a non-inverting input terminal, an inverting terminal, and an output terminal, the hysteresis amplifier being disposed in a modem side circuit and configured to operate from a modem side supply voltage, where the non-inverting terminal is configured to receive the first data signal from a second terminal of the first isolation capacitor, and where the inverting terminal is configured to be coupled to a first terminal of a second isolation capacitor;
a first resistor coupled between the non-inverting input terminal of the hysteresis amplifier and a reference circuit node configured to receive a modem side reference voltage;
a second resistor coupled between the inverting input terminal of the hysteresis amplifier and the reference circuit node; and
a third resistor configured to be coupled between a second terminal of the second isolation capacitor and another circuit node configured to receive a line side reference voltage.

13. The circuit of claim 12, where the impedance of the first driver substantially matches an impedance of the third resistor.

14. The circuit of claim 12, where the modem side reference voltage is selected to be at approximately a center of the modem side supply voltage and where the line side reference voltage is selected to be at approximately a center of the line side supply voltage.

15. An isolation circuit, the circuit comprising:
a single-ended driver, the driver having an input terminal for receiving a data signal from a line pair and an output terminal for outputting the data signal to a first terminal of an isolation capacitor, the driver being configured to operate from a first power supply voltage obtained from the line pair, wherein the driver has another input terminal for receiving a reference voltage that is substantially half of the first power supply voltage;
a hysteresis amplifier having a non-inverting and an inverting input terminal and an output terminal, where the non-inverting input terminal of the amplifier is configured to be coupled to a second terminal of the isolation capacitor, the amplifier being configured to operate from a second power supply voltage;
a first resistor coupled between the inverting input terminal of the amplifier and a circuit node configured to receive a reference voltage; and
a second resistor coupled between the non-inverting input terminal of the amplifier and the circuit node configured to receive a reference voltage.

16. The circuit of claim 15, where the reference voltage is approximately at a midpoint of the second supply voltage.

17. The circuit of claim 15, where an impedance of the first resistor is selected such that the first resistor and the first isolation capacitor form a high pass filter.

18. The circuit of claim 17, where the high pass filter is configured to pass frequencies above 300 MHz.

19. The circuit of claim 15, the circuit further including:
a pulse-width-modulation (PWM) encoder disposed between the line pair and the driver for PWM encoding the data signal to produce a PWM encoded data signal for input to the driver, the PWM encoder having an input terminal for receiving the data signal and an output terminal coupled to the input terminal of the driver for outputting the PWM encoded data signal to the driver; and
a PWM decoder for decoding the PWM encoded data signal and output the data signal, the PWM decoder having an input terminal for receiving the PWM encoded data signal from the output terminal of the amplifier and an output terminal for outputting the data signal.

20. An isolation circuit, the circuit comprising:
a driver, the driver having an input terminal for receiving a data signal from a line pair and an output terminal for outputting the data signal to a first terminal of an isolation capacitor, the driver being configured to operate from a first power supply voltage obtained from the line pair;
a hysteresis amplifier having a non-inverting and an inverting input terminal and an output terminal, where the non-inverting input terminal of the amplifier is configured to be coupled to a second terminal of the isolation capacitor, the amplifier being configured to operate from a second power supply voltage;

a first resistor coupled between the inverting input terminal of the amplifier and a circuit node configured to receive a reference voltage;

a second resistor coupled between the non-inverting input terminal of the amplifier and the circuit node configured to receive a reference voltage;

a pulse-width-modulation (PWM) encoder disposed between the line pair and the driver for PWM encoding the data signal to produce a PWM encoded data signal for input to the driver, the PWM encoder having an input terminal for receiving the data signal and an output terminal coupled to the input terminal of the driver for outputting the PWM encoded data signal to the driver;

a PWM decoder for decoding the PWM encoded data signal and output the data signal, the PWM decoder having an input terminal for receiving the PWM encoded data signal from the output terminal of the amplifier and an output terminal for outputting the data signal;

a voltage-to-frequency converter (VFC) disposed between the line pair and the driver and configured to convert the data signal to a frequency encoded signal;

a VFC decoder configured to receive the frequency encoded signal and decode the frequency encoded signal to generate a digital count value; and a processor for receiving the digital count value and performing at least one of ring detection, on-hook call monitoring, on-hook line voltage measurement, off-hook holding circuits, off-hook 2–4 wire hybrid, off-hook transmit and receive audio, and hook control.

* * * * *